Dec. 8, 1959  C. A. L. RUHL  2,916,050
FOUR POSITION CONTROL VALVE HAVING A FLOAT POSITION
Filed Sept. 17, 1958  2 Sheets-Sheet 2
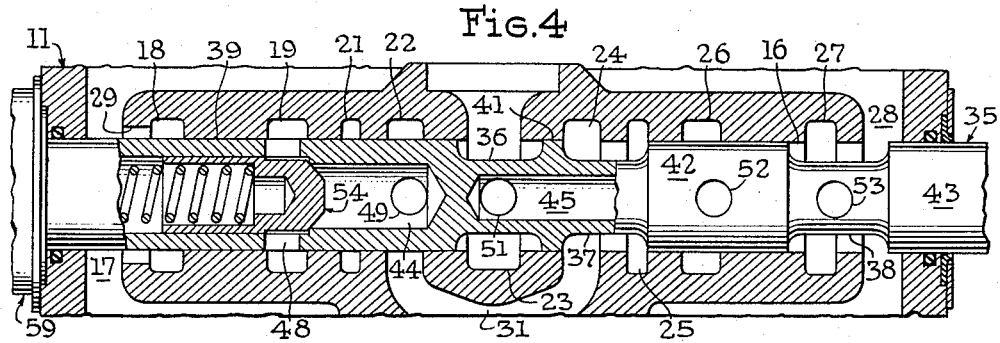
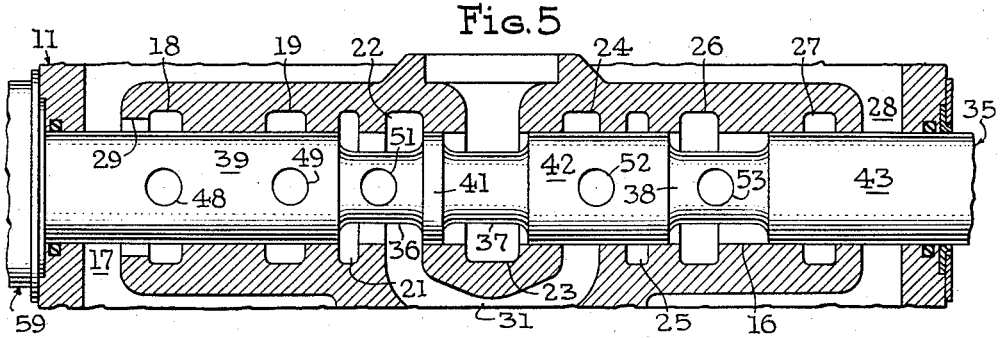
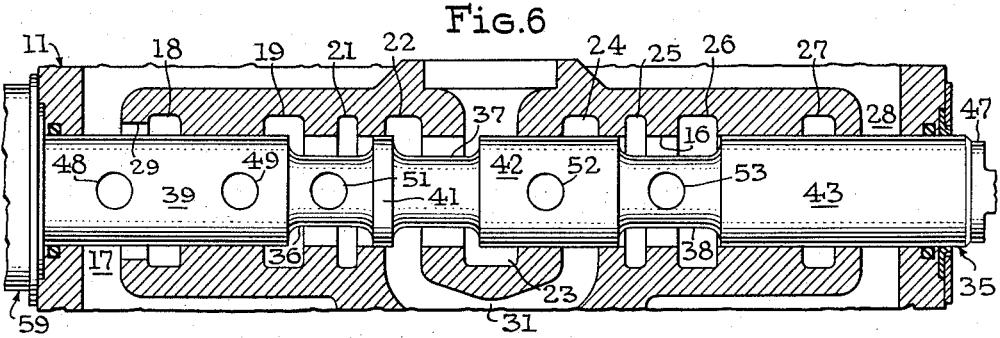
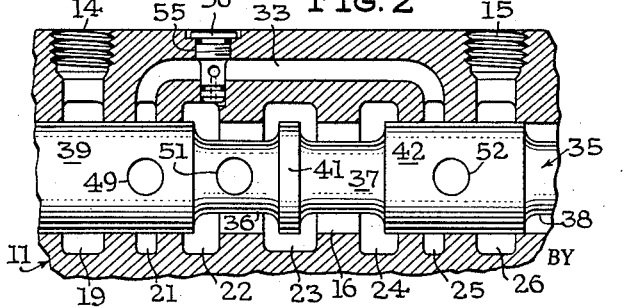
INVENTOR
Charles A. L. Ruhl
ATTORNEYS United States Patent Office 2,916,050
Patented Dec. 8, 1959

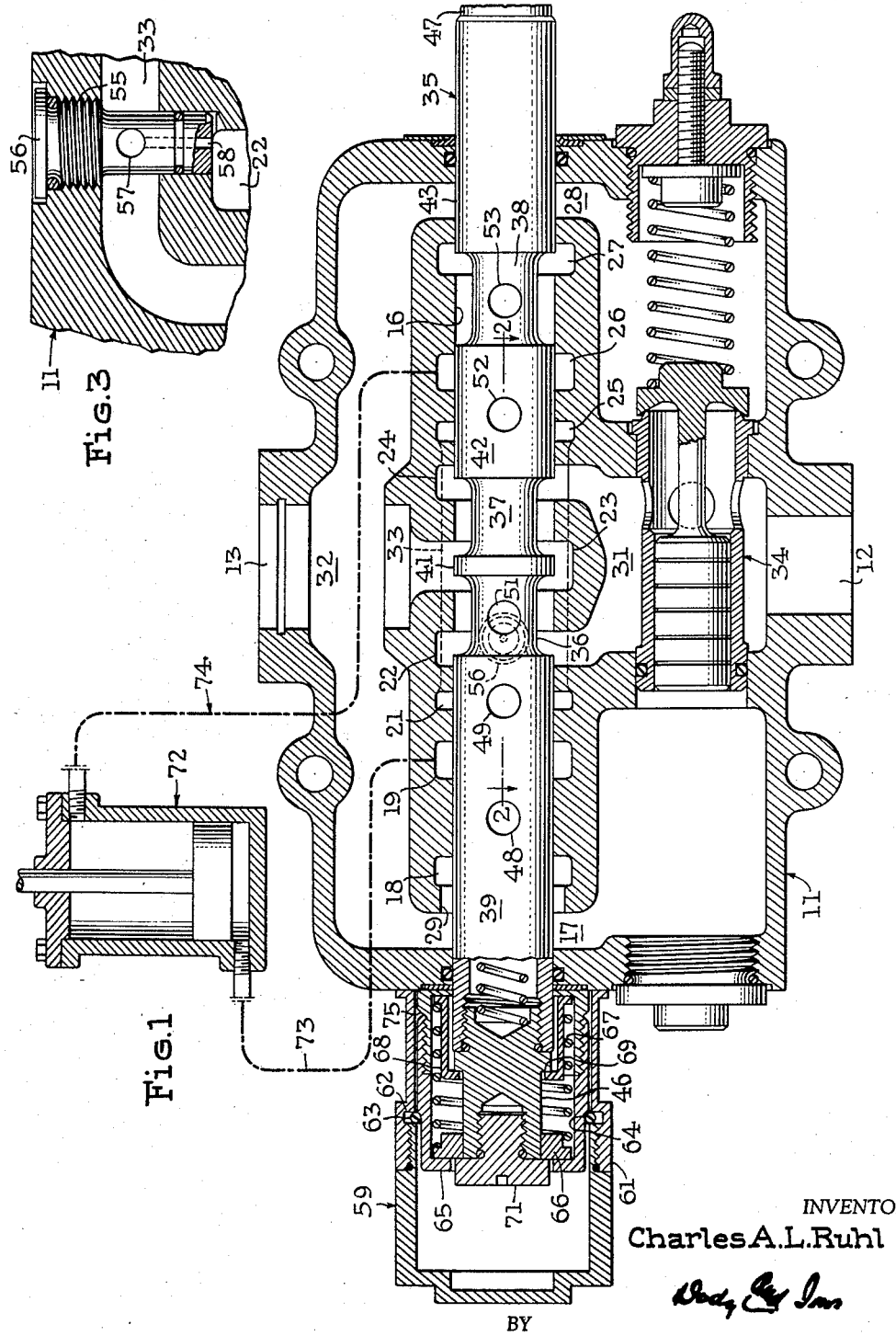

2,916,050

FOUR POSITION CONTROL VALVE HAVING A FLOAT POSITION

Charles A. L. Ruhl, Kalamazoo, Mich., assignor to The New York Air Brake Company, a corporation of New Jersey Application September 17, 1958, Serial No. 761,592

5 Claims. (Cl. 137—622)

This invention relates to control valves for double-acting fluid pressure motors.

A typical device of this type is an open-center valve which, together with a reservoir, a pump and a double-acting differential area piston motor, forms a control system for positioning the bucket of a loader used in earth-moving operations. Usually these valves have four operative positions, namely, a "raise" position in which the pump and reservoir are connected with opposite sides of the fluid motor, a "lower" position in which the pump and reservoir connections with the fluid motor are reversed, a "neutral" or "hold" position in which the connection with each side of the fluid motor is blocked and the pump is unloaded to the reservoir, and a "float" position in which both sides of the fluid motor are connected with the pump and an unloading path is established between the pump and the reservoir.

The "float" position is used to permit dropping of the bucket from a raised position and the piston motor is usually arranged so that this action contracts the piston end of the motor. Since the area of this end of the motor is greater than the area of the rod end, more fluid is expelled from the contracting side of the motor than is required to fill the space on the expanding side. It is for this reason that the interconnection between the two sides of the motor must be in communication with the unloading path between the pump and the reservoir.

In large loaders having massive buckets, the piston of the motor frequently moves so rapidly that the expanding chamber of the motor cannot be maintained liquid-filled. This condition, frequently called cavitation, is undesirable because it impairs the control sensitivity of the system. In the past, cavitation has been minimized by restricting the unloading path from the pump to the reservoir. This restriction imposes a back pressure on the contracting side of the motor and slows down the movement of the motor piston. This solution, although satisfactory from the standpoint of minimizing cavitation, has the disadvantage that it wastes energy because it restricts and thus heats the fluid flowing along the unloading path.

The object of this invention is to provide a control valve having the four operative positions mentioned above in which, in the "float" position, the unloading path affords free communication between the pump and the reservoir and the restriction, which imposes a back pressure on the contracting side of the motor, is located in a flow passage connecting this path with the interconnection between the two sides of the piston motor. In this way, it is possible to achieve the cavitation-minimizing results afforded by prior valves without incurring the energy losses inherent in those valves.

A preferred embodiment of the invention will now be described in detail with reference to the accompanying drawings, in which:

Fig. 1 is an axial sectional view of a hollow plunger open-center valve incorporating the invention showing the plunger in its "neutral" position.

Fig. 2 is a sectional view taken on line 2—2 of Fig. 1 showing cross-over passage 33 and the restrictor plug 56.

Fig. 3 is an enlarged view of the restrictor plug shown in Fig. 2.

Fig. 4 is a view similar to Fig. 1 showing the plunger in its "raise" position.

Fig. 5 is a view similar to Fig. 1 showing the plunger in its "lower" position.

Fig. 6 is a view similar to Fig. 1 showing the plunger in its "float" position.

Referring to Figs. 1 and 2, the valve comprises a housing 11 having inlet and exhaust ports 12 and 13, respectively, and two motor ports 14 and 15. Extending through the housing is a valve bore 16 which is encircled by eleven longitudinally spaced annular chambers 17 through 19 and 21 through 28. The valve bore 16 is counterbored at 29 to provide a continuously open flow path between annular chambers 17 and 18. Chambers 22 and 24 communicate with inlet port 12 via passage 31 while chambers 17, 23 and 28 communicate with exhaust port 13 via passage 32. A cross-over passage 33 interconnects annular chambers 21 and 25. A conventional relief valve 34 by-passes pressure fluid from passage 31 to passage 32.

Mounted in bore 16 is a slidable valve plunger 35 formed with three longitudinally spaced grooves 36, 37 and 38 which define valve lands 39, 41, 42 and 43. Extending inward from opposite ends of the plunger 35 are two axial bores 44 and 45 whose outer ends are closed and sealed by threaded plugs 46 and 47. Two circumferential series of radial passages 48 and 49 intersect axial bore 44 and three similar series 51, 52 and 53 intersect bore 45. A conventional spring-biased check valve 54 is mounted within bore 44 for preventing back flow from radial passages 48 into the bore 44.

As shown in Figs. 2 and 3, the housing 11 is formed with a threaded bore 55 which interconnects cross-over passage 33 and annular chamber 22. A threaded restrictor plug 56, containing a radial passage 57 and an axial passage 58, is mounted in the bore 55 and sealed therein as shown. These passages 57 and 58 constitute a restricted flow path extending between cross-over passage 33 and annular chamber 22.

Associated with the left end of the valve plunger 35 (as viewed in Fig. 1) is a centering device 59. This device includes a two-part casing 61 which is attached to the housing 11 by bolts (not shown) and which, on its inner periphery, contains an annular groove 62. Mounted in this groove is an elastic split ring 63 which, in the Fig. 1 position of the valve, rests against an inclined shoulder 64 formed on a sleeve 65 which encircles the valve plunger 35. Mounted on the outer periphery of plug 46 is a slidable collar 66 which serves as a seat for one end of centering spring 67. The other end of the spring is seated on the outturned flange of a sleeve 68 having an inturned flange engaging the shoulder 69 formed on plug 46. A stop member 71 is threaded into the outer end of plug 46 and is arranged to engage slidable collar 66.

Operation

Prior to operation, inlet and exhaust ports 12 and 13 are connected with a pump and reservoir (not shown), respectively, and motor ports 14 and 15 are connected with opposite sides of a piston motor 72 by lines 73 and 74, respectively. With the plunger in its "neutral" position (Figs. 1 and 2), fluid entering inlet port 12 passes freely to the reservoir via passage 31, annular chambers 22 and 24, plunger grooves 36 and 37, annular chamber 23, passage 32 and exhaust port 13. The motor ports 14 and 15 are isolated from each other and from inlet and exhaust ports 12 and 13 by plunger lands 39 and 42, respectively.

In order to raise the loader bucket, the operator moves the valve plunger to the right to the "raise" position shown in Fig. 4 against the bias of spring 67 acting through collar 66 and stop member 71. In this position, plunger lands 39 and 41 interrupt communication between inlet and exhaust ports 12 and 13 and the fluid delivered by the pump flows to the piston end of motor 72 via passage 31, annular chamber 22, radial passages 49, axial bore 44, check valve 54, radial passages 48, annular chamber 19, motor port 14, and line 73. Fluid is exhausted from the rod end of the motor to the reservoir via line 74, motor port 15, annular chamber 26, radial passages 52, axial bore 45, radial passages 53, plunger groove 38, annular chamber 28, passage 32, and exhaust port 13. Axial bore 45, radial passages 51, plunger groove 36, annular chamber 23 and passage 32 provide a parallel exhaust path. When the motor 72 has moved the desired distance, the operator releases plunger 35 and spring 67 returns it to the "neutral" position, cutting off flow to and from the motor and unloading the pump.

It should be noted that a positive pressure will exist in annular chamber 19 when the bucket is in an elevated position. Check valve 54 prevents release of this pressure when the valve plunger 35 is moved to the "raise" position and thus it serves to maintain the bucket in its current position during the time interval required for the pump to build up operating pressure in axial bore 44.

To lower the bucket, the operator moves the plunger 35 to the left from the Fig. 1 position to the "lower" position shown in Fig. 5. This motion is resisted by spring 67 acting through sleeve 68 and shoulder 69. In the "lower" position, plunger lands 41 and 42 interrupt communication between inlet and exhaust ports 12 and 13. High pressure fluid flows to the rod end of motor 72 via passage 32, annular chamber 24, radial passages 52, axial bore 45, radial passages 53, annular chamber 26, motor port 15, and line 74. A parallel supply path to axial bore 45 is formed by annular chamber 22 and radial passages 51. The piston end of the motor is exhausted to the reservoir via line 73, motor port 14, annular chamber 19, radial passages 49, axial bore 44, check valve 54, radial passages 48, annular chamber 18, counterbore 29, annular chamber 17, passage 32, and exhaust port 13. When the operator releases the plunger 35, spring 67 will again return it to the "neutral" position.

The bucket can be dropped by moving the valve plunger 35 from its "neutral" position of Fig. 1 to the left to the "float" position of Fig. 6. In moving to the "float" position, the plunger 35 first moves to the "lower" position in which spring 67 is fully compressed and there is a rigid link established between plunger 35 and sleeve 65 through the inturned flange of sleeve 68 and slidable collar 66. Further movement to the left from the "lower" position causes inclined shoulder 64 to force split ring 63 outward into groove 62. The ring 63 and groove 62 form an impositive detent and indicate to the operator that he has moved the plunger 35 through the "lower" position. Movement of the inclined shoulder 64 to the left past ring 63 disengages the detent and permits the sleeve 65 to shift to a position in which ring 63 comes to rest in V-groove 75. The position of sleeve 65, relative to the plunger 35 in the "float" position, is the same as it is in the "neutral" position. The operator may now release the plunger and the impositive detent formed by split ring 63 and V-groove 75 will retain it in the Fig. 6 position.

In the "float" position, the two motor ports 14 and 15 are interconnected by annular chamber 19, plunger groove 36, radial passages 51, axial bore 45, radial passages 53, plunger groove 38, and annular chamber 26. Another interconnecting path is formed by plunger groove 36, annular chamber 21, cross-over passage 33, annular chamber 25, and plunger groove 38. The second interconnecting path, including cross-over passage 33, is in restricted communication with the unloading path between inlet port 12 and exhaust port 13 through radial passage 57 and axial passage 58 formed in restrictor plug 56. Since, in the "float" position, the piston side of motor 72 is contracted, more fluid will be discharged into line 73 than need be supplied through line 74 to maintain the rod end of the motor liquid-filled. The excess fluid is conveyed to the reservoir through the passages 57 and 58 in restrictor plug 56 and, because these passages in effect constitute a metering orifice, a back pressure is imposed on motor 72 which limits the rate of descent of the loader bucket and thus minimizes cavitation. This result is achieved without unnecessary energy losses because the unloading path between inlet port 12 and exhaust port 13 (comprising passage 31, annular chamber 22, plunger groove 37, annular chamber 23, and passage 32) is unrestricted.

In order to return the plunger 35 to the "neutral" position, the operator pulls it to the right, compressing spring 67 and bringing the plunger into rigid contact with sleeve 65 through stop member 71, collar 66 and sleeve 68. Additional force will cause ring 63 to rise out of V-groove 75, thus freeing the detent. Spring 67 will now expand and shift sleeve 65 to the right. Further movement of plunger 35 will move sleeve 65 to the position wherein ring 63 is again resting against inclined shoulder 64. The operator can now release the plunger 35 and spring 67 will return it to the "neutral" position.

The restrictor plug 56 serves not only to minimize cavitation without needless waste of energy but also to increase the versatility of the valve. In most prior valves (of the type mentioned previously), restriction of the unloading path was accomplished by the edge of one of the plunger lands. Since the back pressure requirements depend upon the physical characteristics of the loader, this meant that the size of this land or the motion of the plunger had to be tailored to each specific installation. This procedure was expensive and oftentimes it was difficult to regulate accurately the amount of restriction. The present valve is not subject to these disadvantages because it can be adapted for use in different installations by simply changing the restrictor plug 56. The same degree of versatility could be obtained, without adversely affecting performance, if the plug 56 were replaced by an adjustable orifice.

As stated previously, the drawings and description relate only to a preferred embodiment of the invention. Since many changes can be made in the structure of this embodiment without departing from the inventive concept, the following claims should provide the sole measure of the scope of the invention.

What is claimed is:

1. A valve comprising a housing having inlet and exhaust ports and first and second motor ports; passageways interconnecting the four ports; a movable valve element controlling flow through the passageways, the valve element being shiftable in reverse directions from a neutral position and having three other operative positions; and means for shifting the valve element between two limiting positions located on opposite sides of the neutral position, the valve element when moving between limiting positions passing successively through a first operative position in which the inlet and exhaust ports are connected with the first and second motor ports respectively and are isolated from each other, a neutral position in which the inlet and exhaust ports are interconnected and each motor port is isolated from the other three ports, a third operative position in which the inlet and exhaust ports are connected with the second and first motor ports respectively and are isolated from each other, and a fourth operative position in which the two motor ports are interconnected, the inlet and exhaust ports are interconnected and these two interconnections are in restricted communication with each other.

2. A valve comprising a housing having inlet and exhaust ports and first and second motor ports; passageways interconnecting the four ports; and a shiftable valve element controlling flow through said passageways, said valve element having four operative positions, viz: a first position in which the inlet and exhaust ports are interconnected and each motor port is isolated from the other three ports; second and third positions in which the inlet port is isolated from the exhaust port and is connected with the first and second motor ports, respectively, while the exhaust port is connected with the second and first motor ports, respectively; and a fourth position in which the two motor ports are interconnected, the inlet and exhaust ports are interconnected, and these two interconnections are in restricted communication with each other.

3. A valve comprising a housing having inlet and exhaust ports and first and second motor ports; passageways interconnecting the four ports; and a shiftable valve element controlling flow through said passageways, said valve element having four operative positions, viz: a first position in which each motor port is isolated from the other three ports; second and third positions in which the inlet port is isolated from the exhaust port and is connected with the first and second motor ports, respectively, while the exhaust port is connected with the second and first motor ports, respectively; and a fourth position in which the two motor ports are interconnected, the inlet and exhaust ports are interconnected, and these two interconnections are in restricted communication with each other.

4. A valve comprising a housing containing a first valving surface having nine spaced ports, namely, a central exhaust port, right and left outer exhaust ports located on opposite sides of the central exhaust port, right and left motor ports located between the central exhaust port and the two outer exhaust ports, right and left cross-over ports located between the central exhaust port and the two motor ports, and right and left inlet ports located between the central exhaust port and the two cross-over ports; a flow passage connecting the two cross-over ports; a restricted flow path connecting the flow passage with the left inlet port; and a second valving surface cooperating with the first valving surface and having portions dimensioned and arranged to afford the following four operative positions: a first operative position in which each motor port is isolated from the other eight ports; a second position in which the two inlet ports are isolated from the exhaust ports, the left inlet port is connected with the left motor port and the right motor port is connected with the central exhaust port and the right outer exhaust port; a third operative position in which the two inlet ports are isolated from the exhaust ports, the two inlet ports are connected with the right motor port, and the left motor port is connected with the left outer exhaust port; and a fourth operative position in which the left inlet port is in free communication with the central exhaust port, the left motor port is connected with the left cross-over port, and the right motor port is connected with the right cross-over port.

5. The valve defined in claim 4 in which, in the first position, the two inlet ports are in free communication with the central exhaust port.

References Cited in the file of this patent
UNITED STATES PATENTS

| | | |
|---|---|---|
| 1,099,161 | Brown | June 9, 1914 |
| 2,109,162 | Boehle | Feb. 22, 1938 |
| 2,610,022 | Meddock | Sept. 9, 1952 |
| 2,646,025 | Deardorff | July 21, 1953 |